US012441284B2

(12) United States Patent
Bendiksen et al.

(10) Patent No.: US 12,441,284 B2
(45) Date of Patent: Oct. 14, 2025

(54) RELEASE AND BRAKE MECHANISM FOR ELECTRIC ACTUATOR (71) Applicant: TECHNI HOLDING AS, Borre (NO)

(72) Inventors: Jan Martin Bendiksen, Drammen (NO); Harald Borgen, Horten (NO); David Christian Petersen, Åsgårdstrand (NO); Jens Schweiss, Larvik (NO); Trond Sjulstad, Svarstad (NO); Ola Strand, Tolvsrød (NO)

(73) Assignee: TECHNI HOLDING AS, Borre (NO)

( * ) Notice: Subject to any disclaimer, the term of this patent is extended or adjusted under 35 U.S.C. 154(b) by 855 days.

(21) Appl. No.: 17/638,548

(22) PCT Filed: Aug. 26, 2020

(86) PCT No.: PCT/EP2020/073859
§ 371 (c)(1),
(2) Date: Feb. 25, 2022

(87) PCT Pub. No.: WO2021/037916
PCT Pub. Date: Mar. 4, 2021

(65) Prior Publication Data
US 2022/0297658 A1 Sep. 22, 2022

(30) Foreign Application Priority Data
Aug. 26, 2019 (NO) .................................. 20191024

(51) Int. Cl.
*B60T 13/14* (2006.01)
*B60T 13/74* (2006.01)
(Continued)

(52) U.S. Cl.
CPC ............ *B60T 13/741* (2013.01); *F16D 65/18* (2013.01); *F16H 25/2252* (2013.01);
(Continued)

(58) Field of Classification Search
CPC .... B60T 13/741; F16D 65/18; F16D 2121/24; F16D 2125/40; F16H 25/2252; F16H 2025/2068
(Continued)

(56) References Cited

U.S. PATENT DOCUMENTS

| 2,418,351 A | * | 4/1947 | Jackson | ................... H02K 7/06 |
| | | | | 192/142 R |
| 2,620,683 A | * | 12/1952 | Geyer | ..................... B64C 25/24 |
| | | | | 192/142 R |
| 6,488,260 B1 | * | 12/2002 | Dietz | .................... F16K 31/047 |
| | | | | 464/30 |

FOREIGN PATENT DOCUMENTS

| DE | 298 01 229 U1 | 5/1998 |
| DE | 10 2016 222 149 A1 | 5/2017 |

(Continued)

OTHER PUBLICATIONS

International Preliminary Report on Patentability, issued in PCT/EP2020/073859, dated Jan. 20, 2022.
(Continued)

*Primary Examiner* — Christopher P Schwartz
(74) *Attorney, Agent, or Firm* — Birch, Stewart, Kolasch & Birch, LLP (57) ABSTRACT

An electric fail-safe actuator includes a speed reducer/gear assembly housing arranged between one or more electric motors, and a rotation to linear transformer including a roller or ball nut and a screw, or a nut and a roller or ball screw. The speed reducer/gear assembly housing is connected to an actuator housing via a counter hold release mechanism, allowing the speed reducer/gear assembly housing to co-rotate with a rotational side of the rotation to linear transformer when the counter hold release mechanism is released.

20 Claims, 10 Drawing Sheets

(51) Int. Cl.
  *F16D 65/18*    (2006.01)
  *F16H 25/22*    (2006.01)
  *F16D 121/24*   (2012.01)
  *F16D 125/40*   (2012.01)
  *F16H 25/20*    (2006.01)

(52) U.S. Cl.
  CPC ...... *F16D 2121/24* (2013.01); *F16D 2125/40* (2013.01); *F16H 2025/2068* (2013.01)

(58) Field of Classification Search
  USPC ............. 251/129.12, 129.13, 129.15; 464/30
  See application file for complete search history.

(56) References Cited

FOREIGN PATENT DOCUMENTS

| | | |
|---|---|---|
| EP | 1 333 207 A2 | 8/2003 |
| EP | 3 115 645 A2 | 1/2017 |
| GB | 2 290 840 A | 1/1996 |
| GB | 2 425 341 A | 10/2006 |
| WO | WO 2010/128952 A2 | 11/2010 |

OTHER PUBLICATIONS

International Search Report, issued in PCT/EP2020/073859, dated Oct. 14, 2020.
Norwegian Search Report, issued in Priority Application No. 20191024, dated Mar. 5, 2020.
Written Opinion of the International Searching Authority, issued in PCT/EP2020/073859, dated Oct. 14, 2020.

* cited by examiner

Sharp edge circular orifice.
orifice area << tube area

FIG. 10

RELEASE AND BRAKE MECHANISM FOR ELECTRIC ACTUATOR

TECHNICAL FIELD

The present invention relates to an electric actuator, and more specifically to an electric fail-safe actuator including a fail-safe return release mechanism and speed control of such a fail-safe return mechanism that can drive an output of the electric actuator to a fail-safe position upon loss of power. In critical oil and gas application such an electric actuator would need to provide the stored energy to part or cut a wire line intervention wire.

In the oil and gas industry, the term wireline usually refers to a cabling technology used by operators of oil and gas wells to lower equipment or measurement devices into the well for the purposes of well intervention and reservoir evaluation.

BACKGROUND ART

GB 2.290.840 A relates to an electric brake actuator comprising an electric motor, a gearbox and an electric clutch. The rotational to linear conversion is performed by a ball screw assembly. A brake actuator uses an electric motor to drive a ball screw to compress a brake-actuation spring to release the brake. After the spring has been compressed to release the brake, the electric motor is de-energized, and the spring is prevented from re-engaging the brake by virtue of the fact that the electric motor is connected to the screw via a high ratio gear reducer, which will not reverse-drive. An electric clutch is included between the ball screw and the gear reducer, the clutch being held, electrically, in the locked or drive condition while the brake is required to be held off. The brake is re-applied by releasing or de-energizing the clutch to the non-drive or free condition. The general functional principle of the actuator would be to provide linear actuation of a brake in, for instance, an airplane braking system.

EP 1.333.207 A2 relates to a linear actuator, where the linear actuator comprises rotary motion producing means; linear motion producing means coupled with the rotary motion producing means for converting rotary motion to linear motion; a driven member movable linearly by the linear motion providing means from a first position to a second position; and back-drive means for returning the driven member to the first position. The arrangement is such that the linear motion producing means includes torque reaction means which, in normal operation, is in an activated condition and provides a torque reaction path to enable the driven member to be moved from the first to the second position but which, in the event of a fault, is in a de-activated condition so that it no longer provides the torque reaction path and the back-drive means can move the driven member to the first position, by releasing the stem to rotate without disengaging the rotary motion producing means from the linear motion producing means.

EP 3.115.645 A2 relates to an electromechanical actuator (EMA), where the EMA may comprise a ball nut having an annular geometry centered about an axis. A dual ball screw may be disposed radially inward from the ball nut and configured to rotate about the axis. The dual ball screw may also be mechanically coupled to the ball nut. A ball screw may be disposed radially inward from the ball nut and configured to rotate about the axis. The ball screw may also be mechanically coupled to the dual ball screw.

SUMMARY OF INVENTION

The present invention relates to an electric fail-safe actuator to overcome the challenges of a reliable and compact fail-safe function comprising the following main elements.

The electric fail-safe actuator comprises a speed reducer/gear assembly housing being arranged between one or more electric motors and a rotation to linear transformer, where a fail-safe return release mechanism will allow the speed reducer/gear assembly housing to co-rotate with a nut of the rotation to linear transformer. A return speed of the electric fail-safe actuator comprising the fail-safe return release mechanism may then, at an end of a stroke of the electric fail-safe actuator, be controlled by one or more braking mechanisms of the co-rotation, said co-rotation being activated and dosed by the return speed and/or force of the return. In addition, several safety challenges are addressed, such as safety lock and external override of the electric fail-safe actuator. Furthermore, additional energy for parting or cutting, for instance, a wire line intervention wire will be at hand or will be available from spin energy provided by the rotation of the speed reducer/gear assembly housing. This extra force potential represents an extra safety with regards to a guaranteed cutting of the wire line intervention wire passing through a valve connected to the electric fail-safe actuator while performing a return to the fail-safe state.

As used herein, a rotation to linear transformer should be understood to be a device or arrangement which can convert a rotary movement or motion to a linear movement or motion. Example of such a device or arrangement may, for instance, be a roller screw and nut assembly or a roller nut and screw assembly.

As used herein, a return speed of the electric fail-safe actuator is the speed the electric fail-safe actuator have when being returned to a safe position driven by the spring. In an oil and gas valve head application, the safe position would be a closed valve with the gate valve stem protruding from the valve housing.

As used herein, safety lock and external override of the electric fail-safe actuator should be understood to be a device or mechanism which may be locked to prevent all rotational movement and thereby all linear movement by inserting a mechanical member rendering all rotation impossible. An external override should be understood to be an interface for an external rotational force, for instance, a pneumatic tool, rotating the safety lock function, and thereby allowing operation of the actuator without the use of the internal electric motor.

Technical Problem

All safety critical actuators depend on a highly reliable fail-safe function to provide the needed safety to a system when the actuators are utilized in safety critical systems. An important aspect of the safety system is the fail-safe return movement and the probability that it is performing the intended actuation under the defined circumstances. The integrity of the fail-safe mechanism is depending on primarily the two following factors. Confidence in that a stored energy is at hand or available when needed, and control of said stored energy as the stored energy is transformed and portioned out. To ensure the demanded functionality, these products are often subject to so-called Safety Integrity Level (SIL). To achieve the needed SIL-classification, only components with a solid track record can be included. Furthermore, the number of links in the chain would need to be kept to a minimum. In addition to the mentioned demand for a reliable flow of stored energy, the stored energy would need to be dissipated in the situations where additional obstructions and/or different pressures in, for instance, a connected valve, would result in excess energy at the end of a return movement or a return stroke of the actuator. A demand for extra energy at the end of the return movement or the return stroke of the actuator could occur from a valve in an oil and gas application parting or cutting a wire line intervention line. The challenge is two-sided; The first being; that an electric actuator depends on a rotational transformer/gearing to transform high revolutions per minute (rpm) and low torque from the electric motor to low revolutions per minute and high torque needed for the rotational to linear transformation that will follow. The second being the risk associated with the low torque and potential friction in combination with full return force to cut a potential wire line intervention line.

For several reasons, it is important that the internal rotating members of the speed reducer/gear assembly housing do not rotate during such a condition or state, i.e. the fail-safe return movement. Furthermore, for the reliability of the energy supply from stored elastic energy, it is important to separate the internal rotating members of the rotation to linear transformer/gearing in a way that fulfills the SIL-requirements.

It is an objective of the present invention to minimize and possibly alleviate one or more of the disadvantages of the prior art, or to provide a useful alternative(s).

A further objective of the present invention is to provide an electric fail-safe actuator comprising a fail-safe return mechanism with a return speed control with a minimized need for redundancy while still achieving a high Safety Integrity Level (SIL) approval of the product.

Yet another objective of the present invention being to grant the needed force if needed, for instance to part or cut a wire line intervention wire and not to damage the actuator itself if no obstruction is at hand. In non-oil filled actuators, this absorption of excess energy would need to occur in a non-hydraulic way. Non-oil filled actuators in the sense that the all electric actuator does not contain an oil filling posing as potential environmental challenges if released to the environment. In prior art the challenges mentioned above in sum, has been mitigated by the use of redundancy and complex systems. As a result of double and triple redundancy, the legacy of all electric actuator has not met the size and cost envelope.

This object is achieved by an electric actuator according to independent claim, with additional embodiments set forth in the dependent claims.

Solution to Problem

The present invention relates to an electric actuator, where the electric actuator comprises a speed reducer and/or torque transformer of rotation, wherein a rotational counter hold of a transformer housing and/or carrier of the transformer housing can co-rotate with the rotation of the nut coupled to an output of the actuator when released.

As used herein, a speed reducer and/or torque transformer of rotation should be understood to be, for instance, a gearbox, where the gearbox in one embodiment may comprise an outer housing with a predominantly rotational symmetrical shape.

As used herein, transformer housing is to be understood to be the outer housing of the gearbox, and a carrier is a member on witch said gearbox housing is permanently mounted.

In accordance with a first aspect of the present invention there is provided an electric fail-safe actuator comprising a fail-safe return mechanism allowing the speed reducer/gear assembly housing to co-rotate with a rotational side of the rotation to linear transformer, where the rotational side of the rotation to linear transformer should be understood to be, among others, a ball or roller screw, thus the whole speed reducer/gear assembly housing is co-rotating with the rotational movement of the rotation to linear transformer. In accordance with a second aspect of the present invention the speed at the end of the fail-safe return is controlled by a braking mechanism activated by a return speed and/or the force in said return.

Advantageous Effect of Invention

A first advantageous effect of the present invention is the fact that a release for co-rotation of the speed reducer/gear assembly housing with the rotational movement of the rotation to linear transformer prevents the spinning of internal rotating members of said speed reducer/gear assembly housing.

A second advantageous effect of the invention is the reduced load on a holding mechanism given the larger diameter of the speed reducer/gear assembly housing and thus reducing the force while acting as a counter hold for the output torque from the output axle.

A third advantageous effect of the invention is how the speed reducer/gear assembly housing represents a rotational movement ideal for speed reduction at the end of the return movement or return stroke of the electric actuator. The braking effect is considerable due to a relatively large diameter of said speed reducer/gear assembly housing and the brake surface of said speed reducer/gear assembly housing.

A fourth advantageous effect of the invention is the direct acting speed and/or force from the return movement or return stroke of the electric actuator on the brake mechanism. The brake force is self-adapting based on the position and speed of the return movement or return stroke of the electric actuator. The self-adapting brake mechanism solves the challenging need for speed and excess force if there is a wire line intervention wire through a connected valve. The spin or rotation of the speed reducer/gear assembly housing represents potential energy for excess force to part or cut the wire line intervention wire. Mechanical override and lock are integrated with ease and at a high safety level, due to easy access to an input torque of a rotation to linear transformer.

Such a rotation to linear transformer may, for instance, be in the form of a roller screw, a ball screw or similar, these being mechanical devices for converting rotational motion to linear motion, or vice versa. A roller screw uses rollers as load transfer elements between nut and screw. Similarly, a ball screw is a mechanical linear actuator that translates rotational motion to linear motion.

The three main elements of a typically planetary roller screw are the screw shaft, nut and planetary roller. The screw, a shaft with a multi-start V-shaped thread, provides a helical raceway for multiple rollers radially arranged around the screw and encapsulated by a threaded nut. The thread of the screw is typically identical to the internal thread of the nut. The rollers spin in contact with and serve as low-friction transmission elements between screw and nut. The rollers typically have a single-start thread with convex flanks that limit friction at the rollers' contacts with screw and nut. The rollers typically orbit the screw as they spin (in the manner of planet gears to sun gear), and are thus known as planetary, or satellite, rollers. As with a lead screw or ball screw, rotation of the nut results in screw travel, and rotation of the screw results in nut travel.

A ball screw is a mechanical linear actuator that translates rotational motion to linear motion with little friction. A threaded shaft provides a helical raceway for ball bearings which act as a precision screw. As well as being able to apply or withstand high thrust loads, they can do so with minimum internal friction. They are made to close tolerances and are therefore suitable for use in situations in which high precision is necessary. The ball assembly acts as the nut while the threaded shaft is the screw. In contrast to conventional leadscrews, balls crews tend to be rather bulky, due to the need to have a mechanism to re-circulate the balls.

While reducing friction, ball screws may operate with some preload, effectively eliminating backlash (slop) between input (rotation) and output (linear motion).

A swashplate comprises a disk attached to a shaft, where the disk is mounted to the shaft at an oblique angle, which causes its edge to appear to describe a path that oscillates along the shaft's length as observed from a non-rotating point of view away from the shaft. The greater the disk's angle to the shaft, the more pronounced is this apparent linear motion. The apparent linear motion can be turned into an actual linear motion by means of a follower that does not turn with the swashplate but presses against one of the disk's two surfaces near its circumference.

A person skilled in the art would know how such rotational to linear transformers could be designed and used, whereby this is not described any further herein.

A fluid shear brake is of the wet or hydro viscous type which transmits torque between drive plates and friction surfaces. Specially formulated transmission fluid is used for cooling and provides a hydro viscous fluid film between the friction disc and the drive plate during the dynamic phase of engagement.

The fluid in shear transmits torque between the two components increases as the clamping pressure increases until mechanical lock up occurs. By cooling the friction surfaces and reducing the mechanical wear, a significant increase of thermal capacity and total cycle life is possible.

Many competitive clutches and brakes depend on friction between dry surfaces surrounded by air to transmit torque. During engagement of dry surfaces, high heat caused by slipping is difficult to dissipate quickly causing wear, glazing, and friction material degradation. This in turn causes positioning inaccuracy, limited service life, and possible safety issues.

Each of the above or in combination represents a considerable advantageous effect.

The present invention relates to an electric actuator comprising a speed reducer and/or torque transformer of rotation, where a rotational counter hold of a transformer housing and/or carrier of the transformer may co-rotate with a rotation coupled to an output of the electric actuator when released.

In a first embodiment of the present invention the rotational counter forces on the speed reducer/gear assembly housing resulting from non-motor generated rotational forces, can be released allowing said speed reducer/gear assembly housing to co-rotate with the rotation originating from the output of the electric actuator, via the rotation side of the rotation to linear transformer, and/or a device for storage of a safety return energy, where the device for storage of the safety return energy may, for instance, be in the form of a spring or the like.

In a second embodiment of the present invention said resulting rotational speed of the speed reducer/gear assembly housing and the rotation to linear transformer is reduced by a braking mechanism with a friction activating force originating from a non-motor driven force, where this non-motor driven force, for instance, may be provided from a linear safety spring of the electric actuator in combination with forces from a gas pressure/fluid pressure from, for instance, a gas valve connected to the electric actuator.

As used herein, a resulting rotational speed should be understood to be the speed of revolution of the gearbox housing resulting from the rotation of the rotational to linear transformer nut rotation.

In a third embodiment of the present invention said resulting rotational speed of the speed reducer/gear assembly housing and the rotation to linear transformer is reduced by a braking mechanism with a friction activating force originating from a non-motor driven force and controlled by an elastic member, for instance a metal spring or another elastic material, such as elastomers. The non-motor driven force may, for instance, be provided from the linear safety spring of the electric actuator in combination with forces from a gas pressure/fluid pressure from, for instance, a gas valve connected in appropriate ways to the electric actuator.

In a fourth embodiment of the present invention said resulting rotational speed of the speed reducer/gear assembly housing and the rotation to linear transformer is reduced by a braking mechanism with friction activating force originating in the non-motor driven speed. The non-motor driven speed may, for instance, be provided from a linear safety spring of the electric actuator in combination with forces from a gas pressure/fluid pressure from, for instance a gas valve connected to the electric actuator. The braking effect may be realized on one or both sides of the speed reducer/gear assembly housing.

In a fifth embodiment of the present invention an activation force for the braking mechanism is transferred via a fluid damper. The characteristics of the activation force for the braking mechanism could be controlled by different effects like the use of different fluids and orifices and/or dashpot designs.

In a sixth embodiment of the present invention a force conducting member forces a material, the material, for instance, being steel, or another brake lining toward a circular surface of the speed reducer/gear assembly housing or towards a rotating member connected to the said speed reducer/gear assembly housing The force generated from the force conducting member will then generate a braking effect between the material or the brake lining and the rotating member, i.e. the speed reducer/gear assembly housing or the rotating member connected to the speed reducer/gear assembly housing. The lining of the brakes may be metallic materials, but it could also be envisaged that other materials may be used, for instance ceramics or the like.

In a seventh embodiment of the present invention the speed reducer/gear assembly housing is linearly displaceable along a main axis or longitudinal axis of the actuator, thereby pressing a brake element, where the brake element comprises a member interacting with a surface of the speed reducer/gear assembly housing or interacting with a surface of a rotating member connected to said speed reducer/gear assembly housing.

In an eighth embodiment of the present invention, a stacked brake system may be used to obtain or generate a braking effect. The stacked brake system may, in one embodiment, comprise two or more lamellar discs. Said lamellar discs are alternately connected to the housing of the actuator and the speed reducer/gear assembly housing in order to achieve a brake effect. The stacked brake system has an advantage in the multiplication of braking effect originating in the same level of activation force.

In a ninth embodiment of the present invention the fluid shear effect between surfaces with different rotating speeds may be utilized. Said surfaces are connected to the speed reducer/gear assembly housing and the actuator housing in an alternating arrangement. The braking effects accurse from the fluid shear effect between the surfaces in the stack, through generation of heat. The fluid shear effect and the utilization in braking are assumed to be known for a person skilled in the art and will not be further described herein.

In a tenth embodiment of the present invention, the brake force is achieved by the use of a fluid pump driven by the rotation of the speed of the speed reducer/gear assembly housing and the fluid stream is guided via a nozzle.

In an eleventh embodiment of the present invention a brake assembly activated by centripetal acceleration originating from the rotational speed of the speed reducer/gear assembly housing may be adopted. The radial force activates a radial expanding brake friction brake.

In an twelfth embodiment of the present invention the release of the fail-safe function may be instigated by receiving electrical signals and/or current and/or potential, where the electric signals and/or current and/or potential may be delivered, for instance, from the control system of an oil rig.

In a thirteenth embodiment of the present invention the release of the fail-safe function is initiated by absence of electrical signals and/or current and/or potential. The lack of current releasing an electromagnetic/electromechanically operated clutch or brake device delivering a holding force when current and/or potential is available. An absence of signal will, by the use of a local electronic circuit result in the lac of current and/or potential mentioned earlier.

In a fourteenth embodiment of the present invention the release may be instigated by a change to fluid pressure and/or flow. The fluid flow and/or fluid pressure acting may be converted to force by means of representatively drag or pressure differences acting on a piston surface. Said generated force triggering the release of the fail-safe return activated by the rotational release of the speed reducer/gear assembly housing.

In a fifteenth embodiment of the present invention the release may be instigated by a defined torque threshold.

In a sixteenth embodiment of the present invention the rotational energy represented in the rotational speed of the speed reducer/gear assembly housing is at hand for the rotational to linear transformer to complete a fail-safe return in addition to the linear force stored by, for instance, an elastic spring element. The spin of the speed reducer/gear assembly housing is feed back to the rotation to linear transformer resulting in an increased linear return force.

In a seventeenth embodiment of the present invention said brake activation force may be multiplied by the use of a difference in the fluid exposed area of plunger(s) and/or piston(s) transforming the brake activation force from the returning member.

In an eighteenth embodiment of the invention an axle with a tooth wheel at one end may engage opposing teeth connected to the speed reducer/gear assembly housing and/or a carrier of the speed reducer/gear assembly housing. The opposite end of said teeth of the speed reducer/gear assembly housing is prepared for application of an external override torque or a static holding lock out force. The override torque to rotate the speed reducer/gear assembly housing being provided by an external torque tool.

In a nineteenth embodiment of the current invention the fluid in the dampener may be gaseous, and the movement towards the speed reducer of the piston results in an increased pressure in the enclosed volume between the surfaces. The increased pressure introduces the brake activation force. The brake activation force can be regulated by introduction of an orifices to the enclosed volume. The size of said orifice would influence the characteristics of the brake activation force.

BRIEF DESCRIPTION OF DRAWINGS

As used herein, an impact speed at the end of the return movement of the actuator A should be understood to be the speed of the stem of actuator as it reaches its inner end position driven by the spring and external load from the valve.

As the electrical potential holding the release mechanism is interrupted, the whole gear box housing is allowed to start spinning as a result of the torque from the rotational to linear transformer originating from the spring and external load. The whole gear box housing is co-rotating with the nut of the rotational to linear transformer, as if the gearbox would be one solid part. As the nut and the gearbox housing co-rotates, the internal members of the gearbox are not rotating due to the self-locking effect/internal friction of the gearbox and the lack of counter hold for the gearbox housing.

FIG. 3 also shows members of the counter hold mechanism comprising a cogged ring 102, a cogwheel 103, an axel 104 and the release mechanism 105.

A representation of this embodiment shows how the activation force for the braking function is achieved and/or regulated by the speed and/or force whereby a force conducting member 201 is engaging by the return movement of the actuator represented by the returning member 107. The force conducting member 201 is arranged adjacent to the brake assembly 207. Said force conducting member 201 is arranged for interaction with the return movement of the actuator resulting in a movement towards the brake assembly 207. The surface 208 compresses the fluid media of the chamber 202 resulting in a pressure engaging the right surface of the brake piston 203 resulting in a leftward movement. Said movement engaging the non-rotating member 204 resulting in a brake activation force responding to the speed and/or force of engagement. The brake effect occurs between the non-rotating member 204 and the rotating force conducting member 210 and between the surface of a non-rotating member 209 connected to the housing and the rotating member 211.

The characteristics of the force generated are set by the fluid in a chamber 202 and the relative pressure exposed areas of brake piston 203 and surface 208 towards said chamber 202. In combination or in an alternative embodiment, said resulting brake activation force resulting from the engagement with the force conducting member 201 is characterized by the elastic properties and design of the elastic member 206.

This embodiment shows a lamellar brake assembly 305 and a friction material disc 306 or a steel disc comprising a number of stacked elements 305, where the number of stacked elements 305 are rotationally connected to the actuator housing 307 and the speed reducer/gear assembly housing 300 in an alternating arrangement. The speed reducer/gear assembly housing 300 is allowed to move along the longitudinal axis of the actuator housing 307 and said movement originating from the brake piston 301 forwarding brake activation force from the return movement of the actuator A.

The movement and force of the member 301 originates from the spring return force and/or the external load on the actuator for instance from the valve. Said movement and force is conducted via the reducer/gear assembly housing 300 and via contact member 304 at its edge. The brake mechanism 303 is activated by contact forces resulting in a rotational brake forces activated by from the linear force and movement of the edge 304 and towards the rigid wall on the opposite end of 303.

Such fluid shear brakes are of a wet or hydro viscous type and transmits torque between drive plates and friction surfaces. A fluid is used for cooling and provides a hydro viscous fluid film between the friction disc and the drive plate during the dynamic phase of engagement.

The transmission fluid in shear transmits torque between the two components increasing as the clamping pressure increases until mechanical lock up occurs.

The hydraulic piston pump 500 comprises a disk 501 connected to a drive shaft 502, a cylinder block 503 comprising a number of openings 504 for reception of pistons 505, where each opening 504 for reception of a piston 505 is provided with a throughgoing opening 506. A valve plate 507 arranged adjacent the cylinder block 503 is provided with an inlet port 508 and an outlet port 509 for a fluid.

The disk 501 is mounted at an oblique angle to the drive shaft 502, where this arrangement will cause the disk's 501 edge to describe a path that oscillates along the drive shaft's 502 length as observed from a non-rotating point of view away from the drive shaft 502. The pistons 505 will follow the path of the disk 501, where this will result in that the openings 504 can be filled with a fluid through the inlet port 508 and emptied through the outlet port 509.

DESCRIPTION OF EMBODIMENTS

Figure 1:
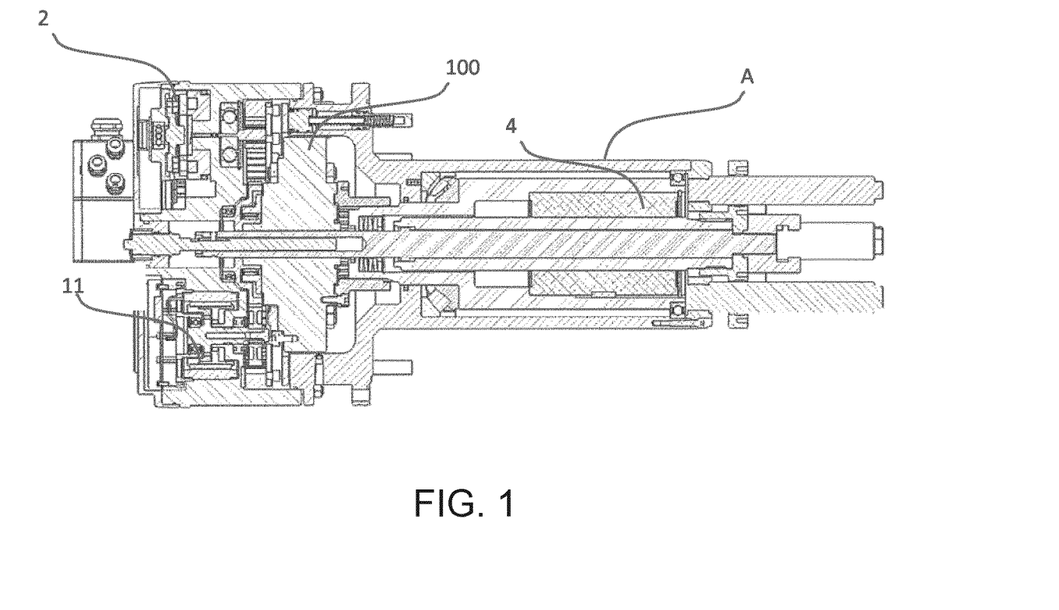
FIG. 1 shows a typical general assembly of an electrical actuator A, according to prior art, into which the current invention could be integrated. The actuator A comprises the following components. One or several electric rotational motor(s) 11, a counter hold mechanism in form of a release clutch 2 for the speed reducer/gear assembly housing 100 and a rotational to linear transformer 4 in the shape of a roller or ball screw. In addition, the actuator A comprises a safety return spring (not shown) and a housing (not shown) in addition to a connection for the linear output force. An electrical controller (not shown) is also a part of the actuator A. A speed reducing function is integrated to dampen the impact speed at the end of the return movement of the actuator A.
Figure 2:
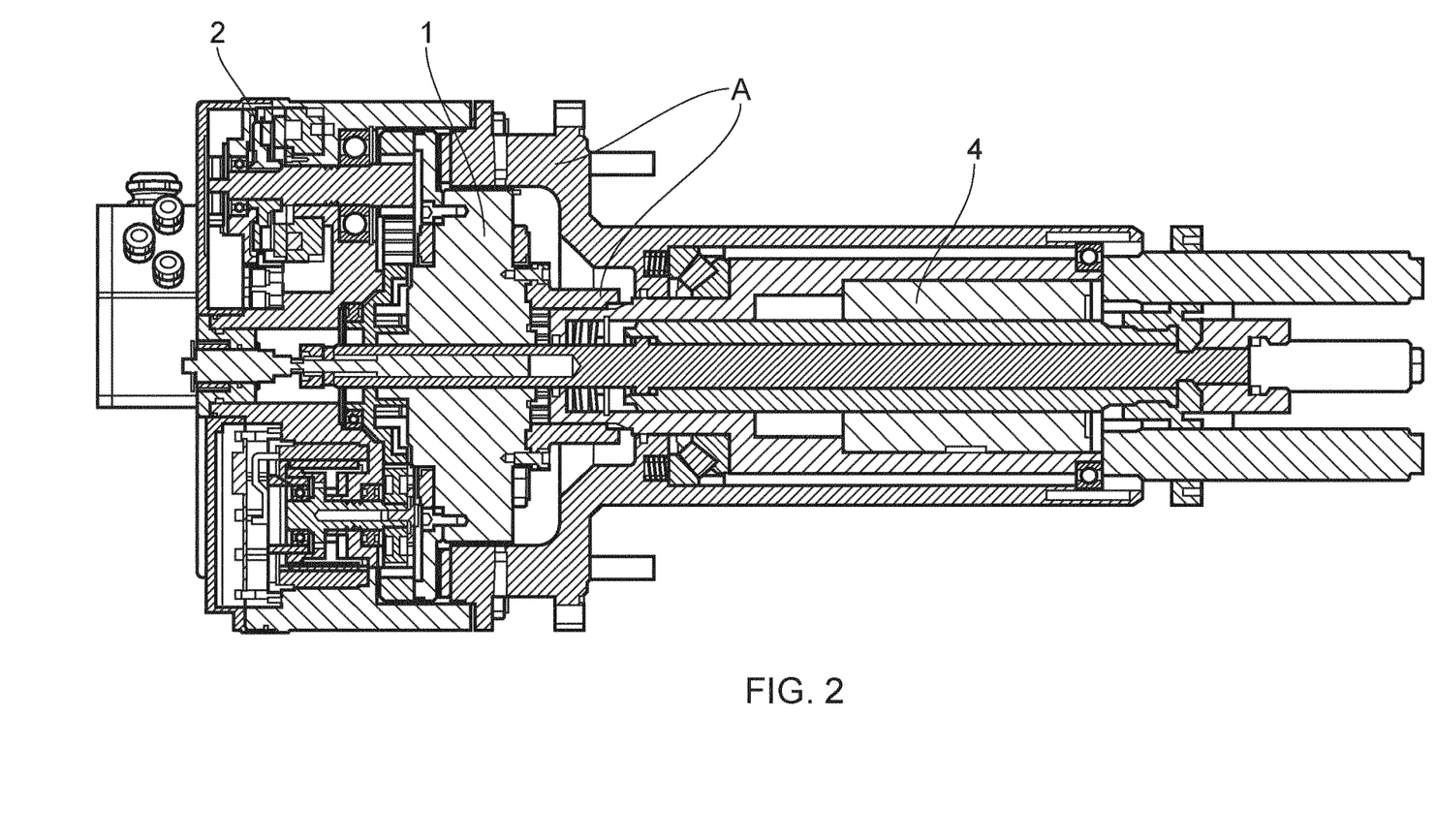
FIG. 2 shows a typical general assembly of an electric actuator according to the present invention, where the electric actuator comprises a speed reducer/gear assembly housing 1 arranged in the actuator housing 106 of the actuator A and a release mechanism 2 in form of a clutch allowing the speed reducer/gear assembly housing 1 to co-rotate with the rotational side of the rotation to linear transformer 4 when releasing the release clutch 2. The release mechanism 2 comprises in a typical embodiment an electrical release clutch mechanism, and the electrical release mechanism 2 may be activated by the absence of electrical potential. The toque transfer member in form of a hollow axel 3 is connected to the output side of the electric actuator A via the rotational to linear transformer 4.
Figure 3:
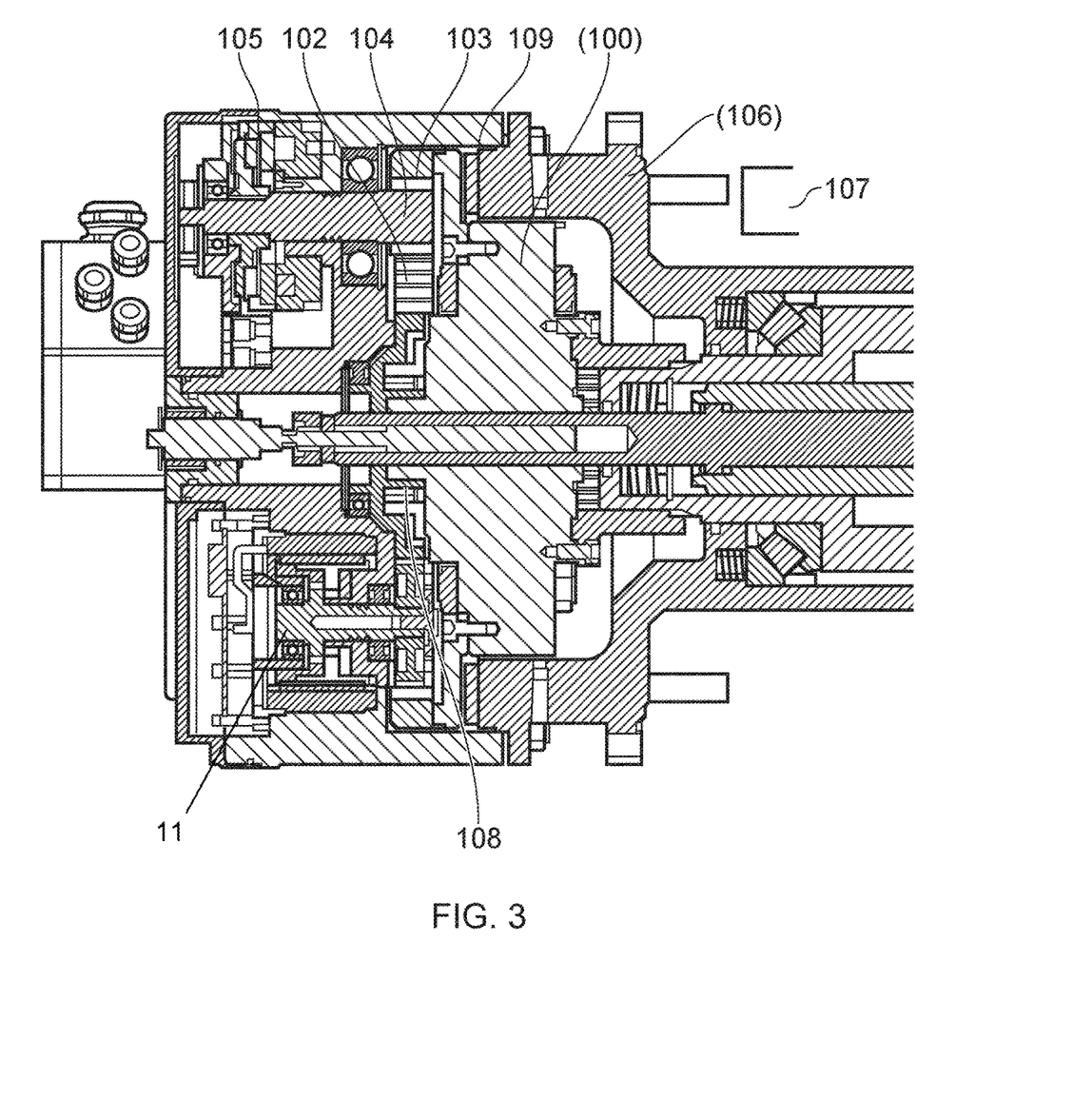
FIG. 3 shows an embodiment where a brake mechanism 109 is used to brake the speed reducer/gear assembly housing 1. The speed reducer/gear assembly housing 1 is axially supported by bearings 108 and thus cannot move axially relative the actuator housing 106. The returning force conducting member 107, for instance in form of a bar, rod or the like, activates the braking mechanism.

In a first embodiment of the present invention the speed reducer/gear assembly housing 100 is mounted in an actuator housing 106 of the actuator A in a manner that allows rotation of said speed reducer/gear assembly housing 100 around a longitudinal axis of the actuator housing 106. The speed reducer/gear assembly housing 100 is connected to the actuator housing 106 via a counter hold release mechanism 105. When altered by an external input or the lack thereof, the counter hold release mechanism 105 would no longer provide the counter hold effect for the speed reducer/gear assembly housing 100 and said speed reducer/gear assembly housing 100 would co-rotate with the rotation originating from the return movement of the actuator A.

Figure 5:
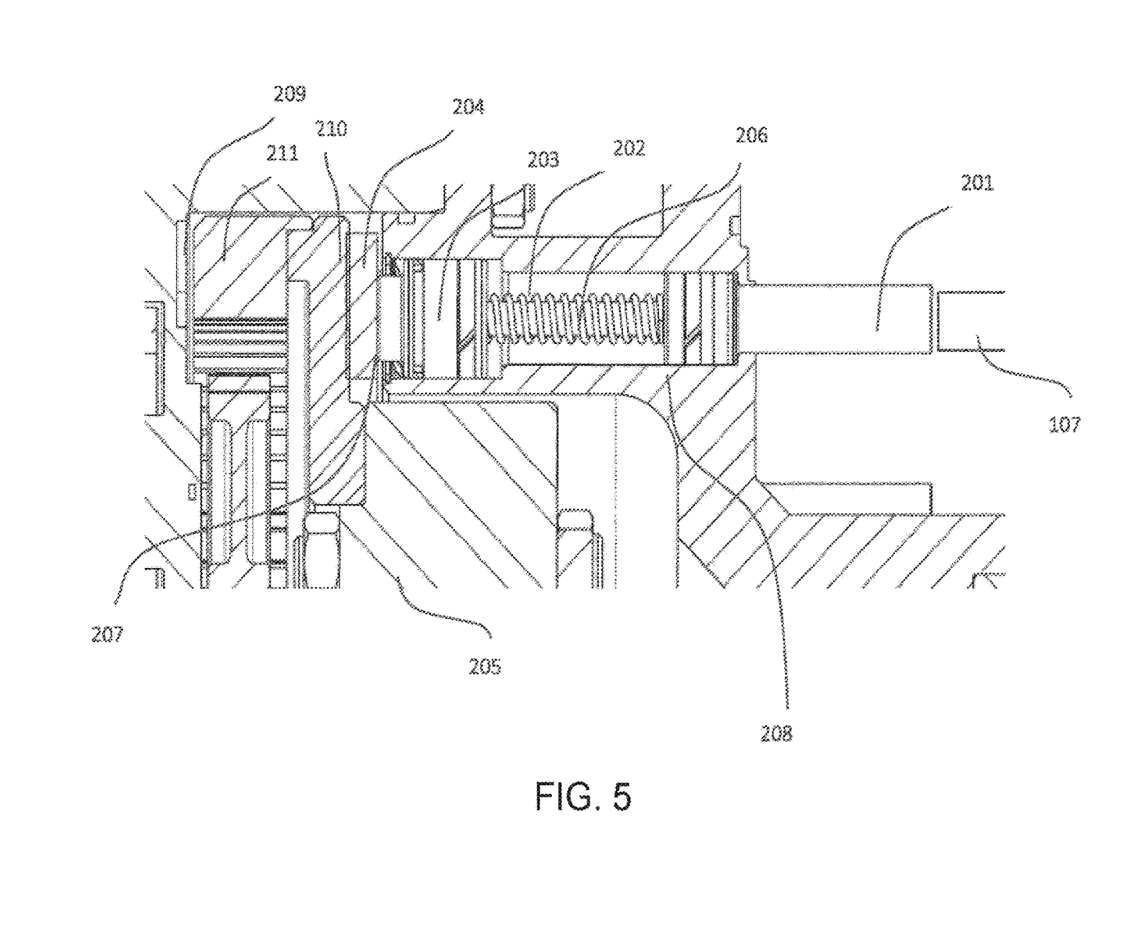
FIG. 5 shows how the speed reducer/gear assembly housing 300 is activated by force and/or speed.

In a second embodiment of the present invention the resulting rotational speed of the speed reducer/gear assembly housing 100 is controlled by means of a braking mechanism. The activation and regulating means for said braking mechanism is regulated by the fail-safe speed of and/or the linear force of the actuator A. The returning linear movement represented by the returning force conducting member 107 connected to the returning movement of the actuator A engaging the force conducting member 201 resulting in an increased pressure in the chamber 202 acting on a surface of a larger piston 203 resulting in an amplified brake force engaging a non-rotating but free member 204 engaging the rotating force conducting member 210 and the rotating member 211 delivering the brake force to generate a second braking effect towards the non-rotating member 209, thereby reducing the rotational speed of the speed reducer/gear assembly housing 100.

Figure 4:
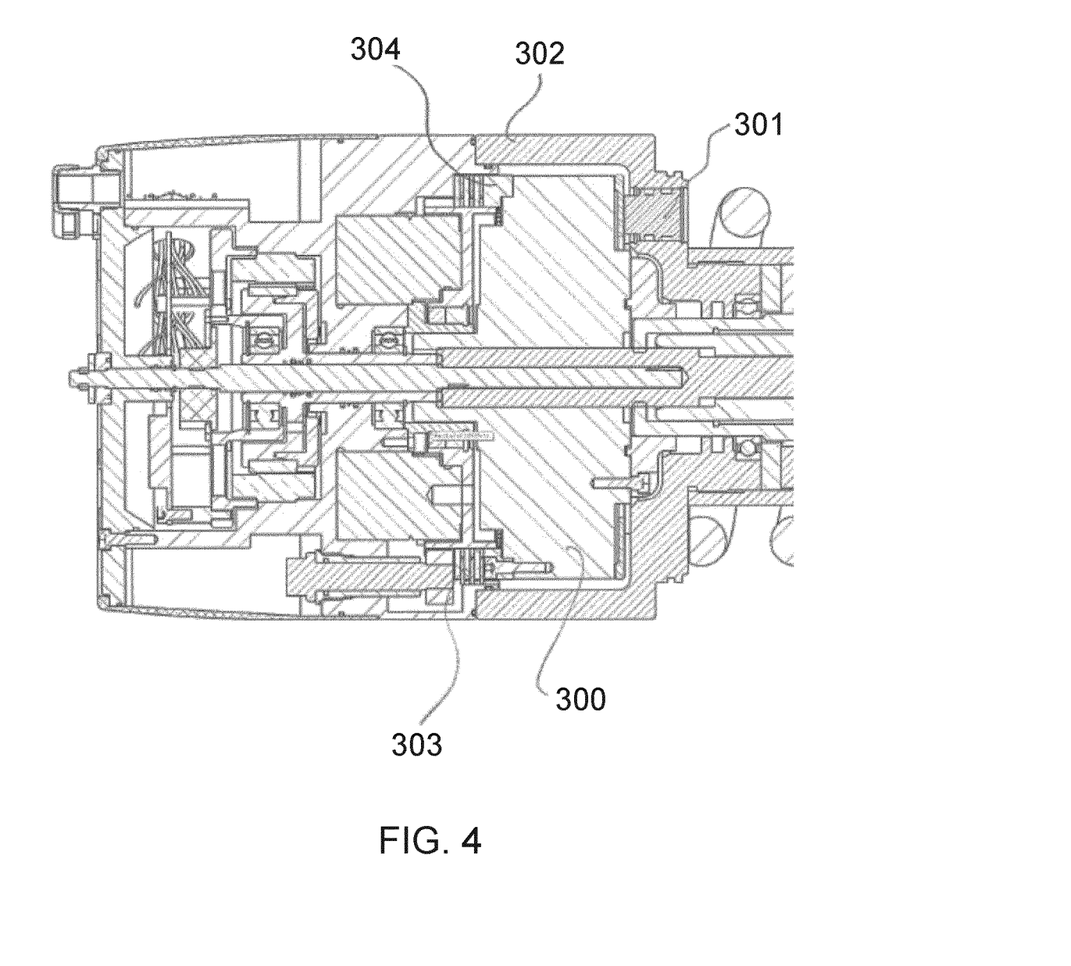
FIG. 4 shows how the brake is activated trough the linearly free sliding speed reducer/gear assembly housing 300. This embodiment shows how the speed reducer/gear assembly housing 300 can move axially relative the actuator housing 302 engaged by the member 301 that activates the brake mechanism 303 via a toroidal contact member 304 arranged on the edge of the speed reducer/gear assembly housing 300. The movement and force of the member (301) originates from the spring return force and/or the external load on the actuator for instance from the valve. Said movement and force is conducted via the reducer/gear assembly housing 300 and via contact member 304 at its edge. The brake mechanism 303 is activated by contact forces resulting in a rotational brake forces activated by from the linear force and movement of the edge 304 and towards the rigid wall on the opposite end of 303. The brake function 303 comprising a lamellar brake assembly 305 and 306, the lamellar brake assembly 305 and 306 comprises a number of stacked elements 305, where the number of stacked elements 305 are rotationally connected to the actuator housing 307, and similar discs 306 are connected to the speed reducer/gear assembly housing 300 in an alternating arrangement.
Figure 6:
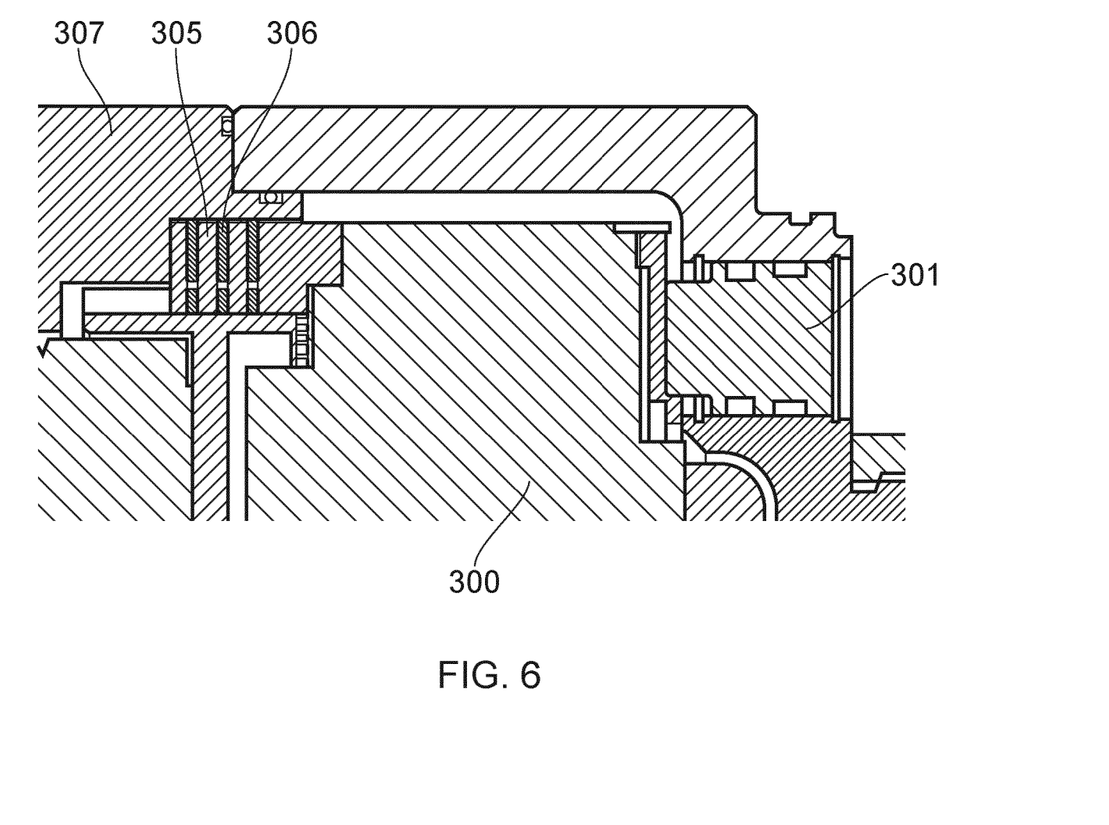
FIG. 6 shows how the speed reducer/gear assembly housing rotation is reduced by lamellar brake discs.

In a third embodiment of the present invention the engaging brake force is conducted from the returning member represented by (107) via an elastic element 206 for instance a spring. The movement and force of the returning member originates from the spring return force and/or the external load on the actuator for instance from the valve. The resulting force from said dampening mechanism engages the spinning speed reducer/gear assembly housing forcing it towards the brake function 303 comprising a lamellar brake assembly 305 and 306, the lamellar brake assembly 305 and 306 comprises a number of stacked elements 305, where the number of stacked elements 305 are rotationally connected to the actuator housing 307, and similar discs 306 are connected to the speed reducer/gear assembly housing 300 in an alternating arrangement. The stiffness of the elastic member 206 regulates the resulting force conducted from the return movement towards the braking mechanism 303.

In a fourth embodiment of the present invention the speed of the moving member (returning member) 107 towards the speed reducer/gear assembly housing 300 determines the brake activation force. The dampening effect and the resulting brake activation force can be realized by a variety of different dampers, all with a stiffening effect resulting from the compression speed from the returning member 107. The speed reducer/gear assembly housing 300 is mounted in a manner that allows linear movement along the axis of the actuator A. The engaging brake force is conducted from the returning member represented by 107 via a dampening mechanism 202, 203, 208 comprising chamber 202, brake piston 203 and surface 208. The resulting force from said dampening mechanism engages the spinning speed reducer/gear assembly housing 300 forcing it towards the brake function 303 on the opposite side. The braking effect occurs between the speed reducer/gear assembly housing edge 304 and the stationary actuator housing. Alternatively, the brake effect occurs between the members 204 and 201 in addition to the braking effect between 201 and 209.

Figure 10:
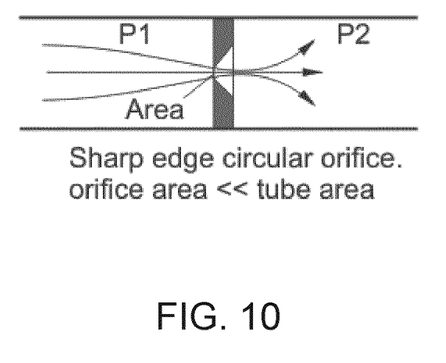
FIG. 10 shows schematically an orifice 600 arranged in a pipe 601 or the like, where the orifice 600 will have the ability to convert the energy in a fluid flow in head of the orifice 600 and thereby generate a braking effect in combination with a hydraulic piston pump as shown in FIG. 9.

In a fifth embodiment of the present invention a fluid-based damper comprising the chamber 202 and an orifice 600 (see FIG. 10) is used to achieve said stiffening effect resulting from the speed of the returning member represented by 107.

In yet another embodiment of the present invention a piston or plunger pump energizing a fluid and an orifice would be used to reduce the rotational speed and dissipate the energy.

Piston or plunger pumps and associated hydraulic components such as orifices are assumed to be known for a person skilled in the art and will not be further described herein. The characteristics of the fluid filled (gas and/or liquid) damper is regulated by selection of fluid media and the associated characteristics in combination with the sizes of orifices placed in the flow loop.

In yet another embodiment of the present invention a centripetal force activated clutches and brakes would be utilized to engage and/or execute the braking and dissipation of energy. Centripetal force activated clutches and brakes are assumed to be known for a person skilled in the art and will not be further described herein.

In yet another embodiment of the present invention the braking effect is achieved by the use of the fluid shear effect. The fluid shear effect and the utilization in braking are assumed to be known for a person skilled in the art and will not be further described herein.

In yet another embodiment of the present invention the braking effect is achieved by the use of the fluid shear effect. The fluid shear effect and the utilization in braking are assumed to be known for a person skilled in the art and will not be further described herein.

Figure 7:
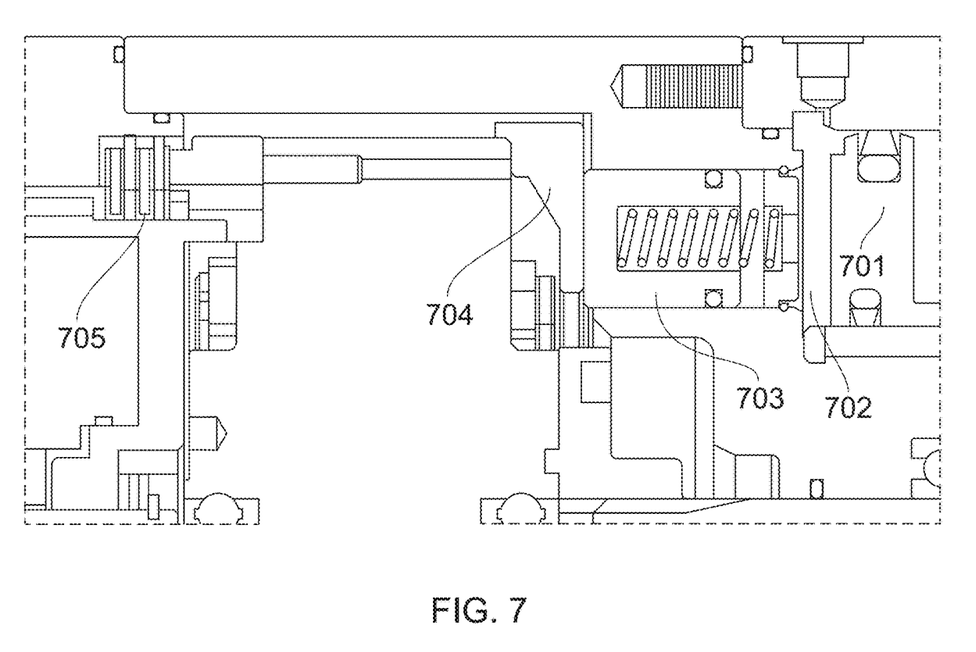
FIG. 7 shows a damper assembly with a gaseous fluid filled volume 702 arranged between a toroidal member 701 linearly movable by engagement by the returning member 107 (see FIG. 1). When activated by the returning member 107 the toroidal member 701 slides in the direction of the piston(s) 702 increasing the pressure in the gaseous filled volume 702. The increased pressure acts on the exposed surfaces of brake piston 703 generating a linear brake activation force conducted to a force conducting ring 704 attached to the speed reducer/gear assembly housing. The force is conducted via and the along the main axis of the speed reducer/gear assembly housing 300 and activates the brake assembly 705.
Figure 8:
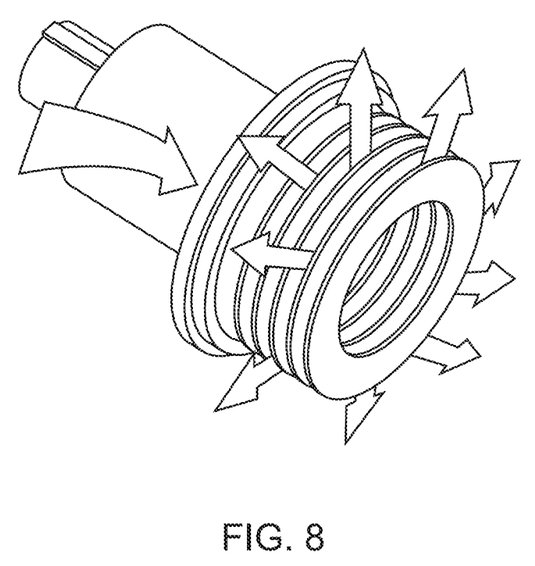
FIG. 8 shows a typical fluid-shear brake assembly where the fluid shear effect absorbs the energy absorbed from the rotation converting said energy to heat.
Figure 9:
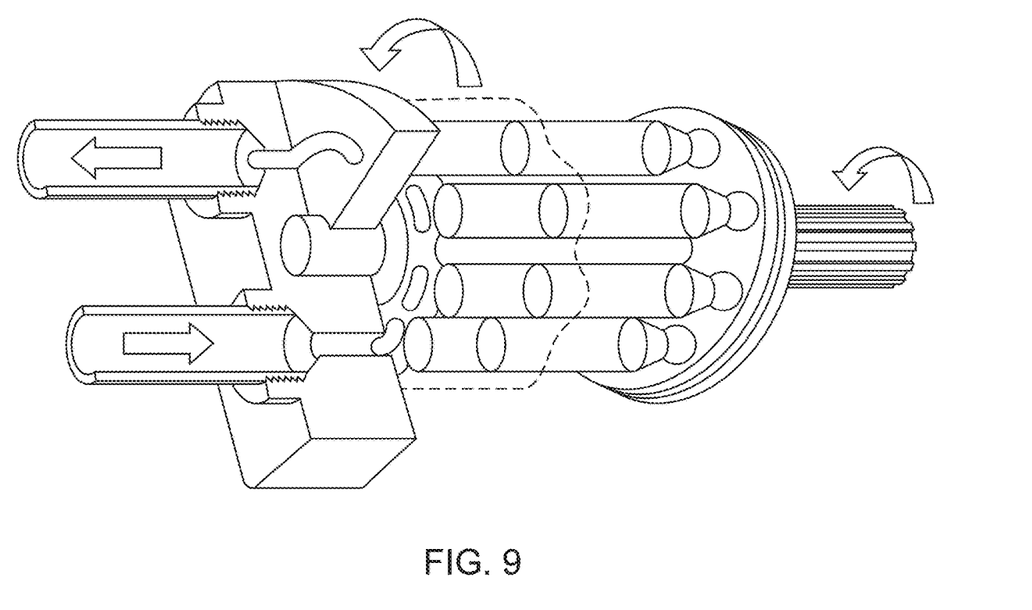
FIG. 9 shows a hydraulic piston pump, where the hydraulic pump will convert rotational input to a fluid flow.

In yet another embodiment of the present invention, the brake activation force is generated by compression of a fluid in a gaseous state. The returning movement of the actuator engages the toroidal member 701. The movement of the toroidal member 701 in the direction of the piston(s) 703 increases the pressure in the volume between 701 and said pistons. The increased pressure acts on the surface of 703 exposed to said pressure resulting in a brake activation force from the piston 703.

It should be noted that several embodiments of the electrical actuator according to the present invention are possible. The scope of the invention is limited by the claims, and a person of skill in the art will be able to make numerous changes to the aforementioned examples without departing from the scope of the invention as defined in the enclosed set of claims.

The invention claimed is:

1. An electric fail-safe actuator comprising:
   a speed reducer/gear assembly housing arranged between one or more electric motors and a rotation to linear transformer comprising a roller or ball nut and a screw, or a nut and a roller or ball screw,
   wherein the speed reducer/gear assembly housing is connected to an actuator housing via a counter hold release mechanism, allowing the speed reducer/gear assembly housing to co-rotate with a rotational side of the rotation to linear transformer when the counter hold release mechanism is released.

2. The electric actuator according to claim 1,
   wherein the electric fail-safe actuator further comprises one or more brake mechanisms for controlling a return speed of the electric fail-safe actuator.

3. The electric actuator according to claim 2, wherein the one or more brake mechanisms is arranged between a first non-rotating member and a force conducting member, wherein the force conducting member is arranged for interaction with a return movement of the actuator resulting in a movement towards a brake assembly and wherein said movement engaging the first non-rotating member resulting in a brake activation force responding to the speed and force of engagement, causing a brake effect between the first non-rotating member and the rotating force conducting member and between the surface of a second non-rotating member connected to the housing and a rotating member.

4. The electric actuator according to claim 3, wherein the brake activating force is regulated by a fluid damper.

5. The electric actuator according to claim 4, wherein said brake activation force is multiplied by the use of a difference in the fluid exposed area of plunger(s) and piston(s) transforming the brake activation force from a returning force conducting member.

6. The electric actuator according to claim 4, wherein the fluid is gaseous, and
wherein a movement towards the speed reducer of a toroidal member results in an increased pressure in a gaseous fluid filled volume arranged between the toroidal member and a brake piston, wherein an increased pressure acting on a surface of the brake piston results in a brake activation force.

7. The electric actuator according to claim 3, wherein the brake activating force is regulated by an elastic member.

8. The electric actuator according to claim 2,
wherein the one or more brake mechanisms is activated by a returning force conducting member.

9. The electric actuator according to claim 8, wherein said one or move brake mechanisms comprises a friction material on the non-rotating member and a force conducting element pressing said friction material of the non-rotating member towards a circular surface of the conducting member rotationally coupled to the speed reducer/gear assembly housing.

10. The electric actuator according to claim 2, wherein said one or move brake mechanisms comprises a friction material on the non-rotating member and a force conducting element pressing said friction material of the non-rotating member towards a circular surface of the conducting member rotationally coupled to the speed reducer/gear assembly housing.

11. The electric actuator according to claim 2, wherein said one or more brake mechanisms comprises one or more stacked segments and where a multitude of said segments are rotationally connected to the speed reducer/gear assembly housing and the actuator housing in an alternating arrangement.

12. The electric actuator according to claim 2, wherein said one or more brake mechanisms comprises a fluid pump and nozzle(s).

13. The electric actuator according to claim 2, wherein said one or more brake mechanisms comprises a fluid shear effect between two or more members with relative rotational speed relative to each other.

14. The electric actuator according to claim 2, wherein said one or more brake mechanisms is activated by centripetal forces activating a radial expanding brake pad assembly.

15. The electric actuator according to claim 1, wherein release by the release mechanism is instigated by receiving electrical signals and/or current and/or potential.

16. The electric actuator according to claim 1, wherein release by the release mechanism is instigated by the absence of an electrical signals and/or current and/or potential.

17. The electric actuator according to claim 1, wherein release by the release mechanism is instigated by a change to fluid pressure and/or flow.

18. The electric actuator according to claim 1, wherein release by the release mechanism is instigated by a defined torque threshold to the release mechanism.

19. The electric actuator according to claim 1, wherein the rotational energy represented in the speed reducer/gear assembly housing rotation, is available for the rotational to linear transformer to complete a fail-safe return in addition to a linear force stored by an elastic element.

20. The electric actuator according to claim 1, wherein an axle with a toothed wheel at one end engages opposing teeth connected to a transformer housing and/or a carrier of the transformer, wherein an opposing end of said axle is arranged for application of an external override torque or a static holding lock out force.

* * * * *